(12) United States Patent
Lusty et al.

(10) Patent No.: US 9,676,239 B1
(45) Date of Patent: Jun. 13, 2017

(54) TRAILER DOLLY

(71) Applicant: BAC INDUSTRIES, INC., Miltona, MN (US)

(72) Inventors: Robert H. Lusty, Alexandria, MN (US); James D. Oberg, Eagle Bend, MN (US)

(73) Assignee: BAC INDUSTRIES, INC., Miltona, MN (US)

( * ) Notice: Subject to any disclaimer, the term of this patent is extended or adjusted under 35 U.S.C. 154(b) by 0 days.

(21) Appl. No.: 15/404,364

(22) Filed: Jan. 12, 2017

(51) Int. Cl.
  *B62D 61/12* (2006.01)
  *B60D 1/24* (2006.01)
  *B60D 1/06* (2006.01)

(52) U.S. Cl.
  CPC .......... *B60D 1/247* (2013.01); *B60D 1/065* (2013.01)

(58) Field of Classification Search
  CPC ..... B62D 53/0864; B60D 1/247; B60D 1/065
  USPC ................................ 280/405.1, 478.1, 476.1
  See application file for complete search history.

(56) References Cited

U.S. PATENT DOCUMENTS

| | | | | |
|---|---|---|---|---|
| 2,570,482 A | * | 10/1951 | Pruitt ................ | B62D 53/0864 280/476.1 |
| 3,865,405 A | * | 2/1975 | Mitchell ............ | B60D 1/07 280/476.1 |
| 4,856,804 A | * | 8/1989 | Nash .................. | B62D 53/0864 280/430 |
| 5,284,356 A | * | 2/1994 | Heider ............... | B62D 53/0864 280/425.1 |
| 6,685,211 B2 | * | 2/2004 | Iles ..................... | B60D 1/075 280/267 |

* cited by examiner

*Primary Examiner* — Tony Winner
(74) *Attorney, Agent, or Firm* — Nikolai & Mersereau, P.A; Thomas J. Nikolai

(57) ABSTRACT

A trailer dolly for joining a trailer to a towing vehicle has a frame mounted on an axle for a pair of wheels. The frame supports a hitch ball assembly that is positionable on the frame for allowing the tongue-weight of a towed trailer that is coupled to the hitch ball to be shifted from a position over the wheels of the dolly to a position that increases traction of the wheels of the towing vehicle.

6 Claims, 3 Drawing Sheets

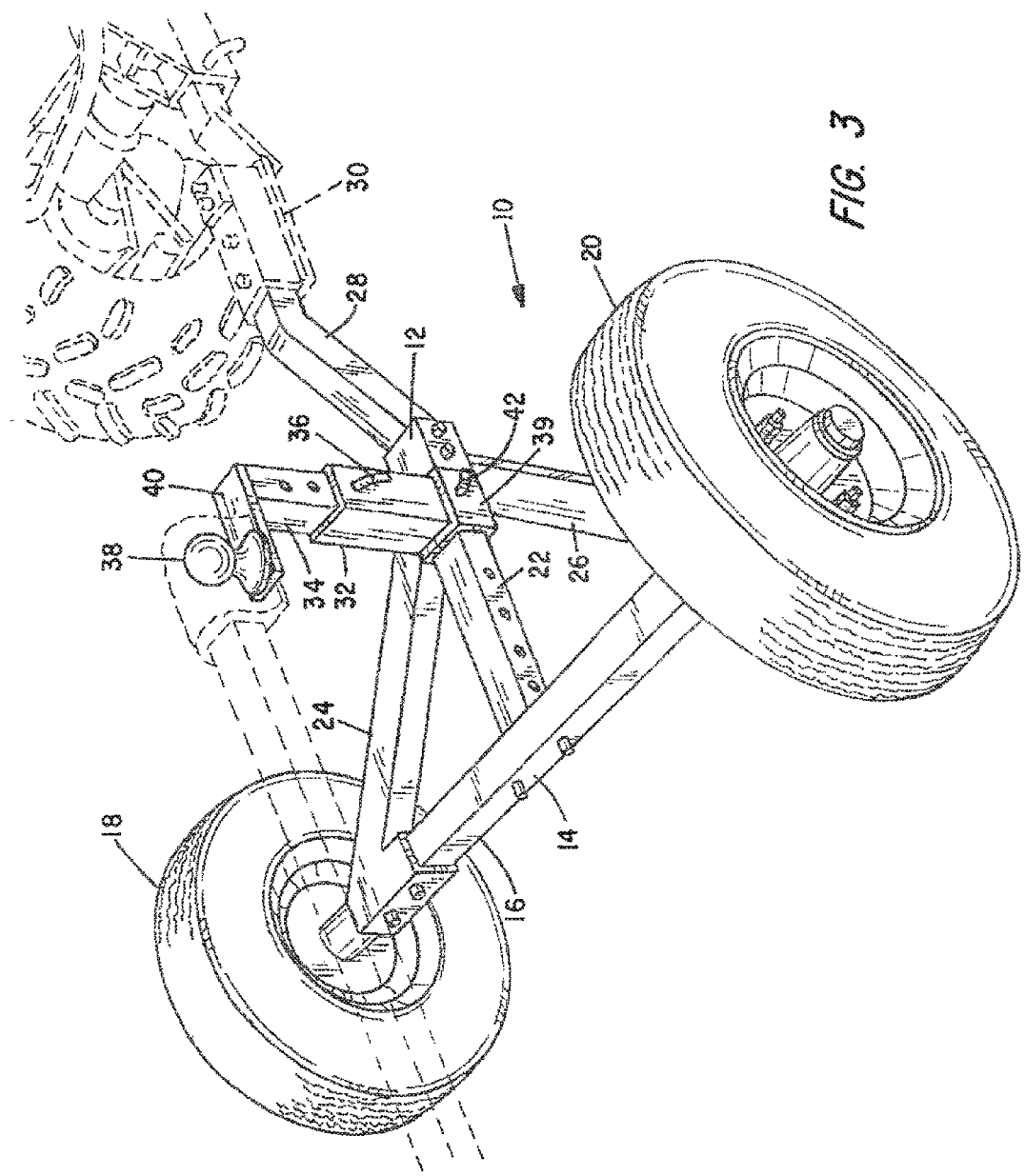

TRAILER DOLLY

CROSS-REFERENCED TO RELATED APPLICATIONS

Not applicable

STATEMENT REGARDING FEDERALLY SPONSORED RESEARCH OR DEVELOPMENT

Not applicable

BACKGROUND OF THE INVENTION

I. Field of the Invention

This invention relates generally to dollies for supporting the tongue-weight of utility trailers and, more particularly, to a dolly having the ability to shift the tongue-weight of a towed trailer to increase traction of either the wheels of the dolly or the wheels of a towing vehicle, such as an all-terrain vehicle (ATV) or a utility task vehicle (UTV).

II. Discussion of the Prior Art

Trailers of various designs, such as box trailers, lawn and garden utility trailers and the like, are designed to be towed by an ATV or garden tractor. A heavily loaded, two-wheel trailer often results in an excessive tongue-weight being applied to a ball hitch mounted on the rear of the garden tractor or ATV and which, over time, can result in damage to the tractor's transmission. Trailer dollies have been devised to join a trailer to a towing vehicle. See, for example, U.S. Pat. No. 2,534,575 to Conley et al, U.S. Pat. No. 2,844,389 to Burnett, U.S. Pat. No. 3,865,405 to Mitchell et al and U.S. Pat. No. 4,491,338 to Sheldracke. See also applicants' earlier U.S. Pat. No. 7,845,670.

Prior art trailer dollies typically may comprise a frame supported by a wheel and axle assembly and carrying a hitch ball whose height above the frame is adjustable. A draw bar is joined to the front end of the frame and includes a coupler at its proximal end for coupling the dolly to a ball hitch on a towing vehicle. The height adjustment hitch ball on the dolly frame provides an attachment point for a trailer to be towed. By incorporating the dolly between the towing vehicle and the trailer, the tongue-weight of the trailer is supported primarily by the dolly and not by the hitch receiver on the back of the towing vehicle. While this is an advantage during on-road trailering as far as better control of the towing vehicle is concerned, it may have a drawback in off-road trailering applications. Where a garden tractor, an ATV or a UTV is being used to pull a heavily loaded trailer or to move a fish house on or from a frozen lake, more weight is often required on the rear wheels of the towing vehicle to provide sufficient traction, especially on sand, in mud, on loose soil or in snow and ice.

It is accordingly a principle object of the present invention to provide an improved trailer dolly that allows the tongue-weight of a trailer being towed to be shifted from a location directly over the wheel and axle assembly of the dolly to a location where more of the tongue-weight is applied to the rear wheels of the towing vehicle.

SUMMARY OF THE INVENTION

The present invention provides a trailer dolly for joining a trailer to a towing vehicle that comprises a frame mounted on an axle for a pair of wheels where the frame supports a hitch ball assembly that is positionable on the frame for allowing a tongue-weight of a towed trailer that is coupled to the hitch ball to be shifted from a position over the wheels of the trailer dolly to a position that increases traction of the wheels of the towing vehicle.

In a preferred embodiment, the trailer dolly comprises a main body having a proximal and a distal end where the main body includes an elongated axle at the distal end having wheels journaled for rotation on opposed ends of the axle. A bar member is affixed to the axle proximate a midpoint of the axle and it extends generally horizontally toward the proximal end of the main body. A ball hitch receiving socket is slideably mounted on this bar member and the socket extends vertically upward from the bar member. A ball hitch assembly, including a post that is adapted to fit and slide within the ball hitch receiving socket, has a plate affixed to an upper end thereof where the plate has a cantilevered segment extending outward from the post's upper end and to which a hitch ball is fastened. By shifting the position of the ball hitch receiving socket along the length of the bar member and by reversing the direction of extension of the cantilevered portion of the plate, the point of attachment of a coupler on the trailer tongue can be moved from a location directly over the axle of the dolly to a more forward position closer to the wheels of the towing vehicle.

BRIEF DESCRIPTION OF THE DRAWINGS

The foregoing features, objects and advantages of the invention will become apparent to those skilled in the art from the following detailed description of a preferred embodiment, especially when considered in conjunction with the accompanying drawings in which like numerals in the several views refer to corresponding parts:

FIG. 3 is a similar view with the ball hitch assembly shifted forward.

DESCRIPTION OF THE PREFERRED EMBODIMENT

Figure 1:
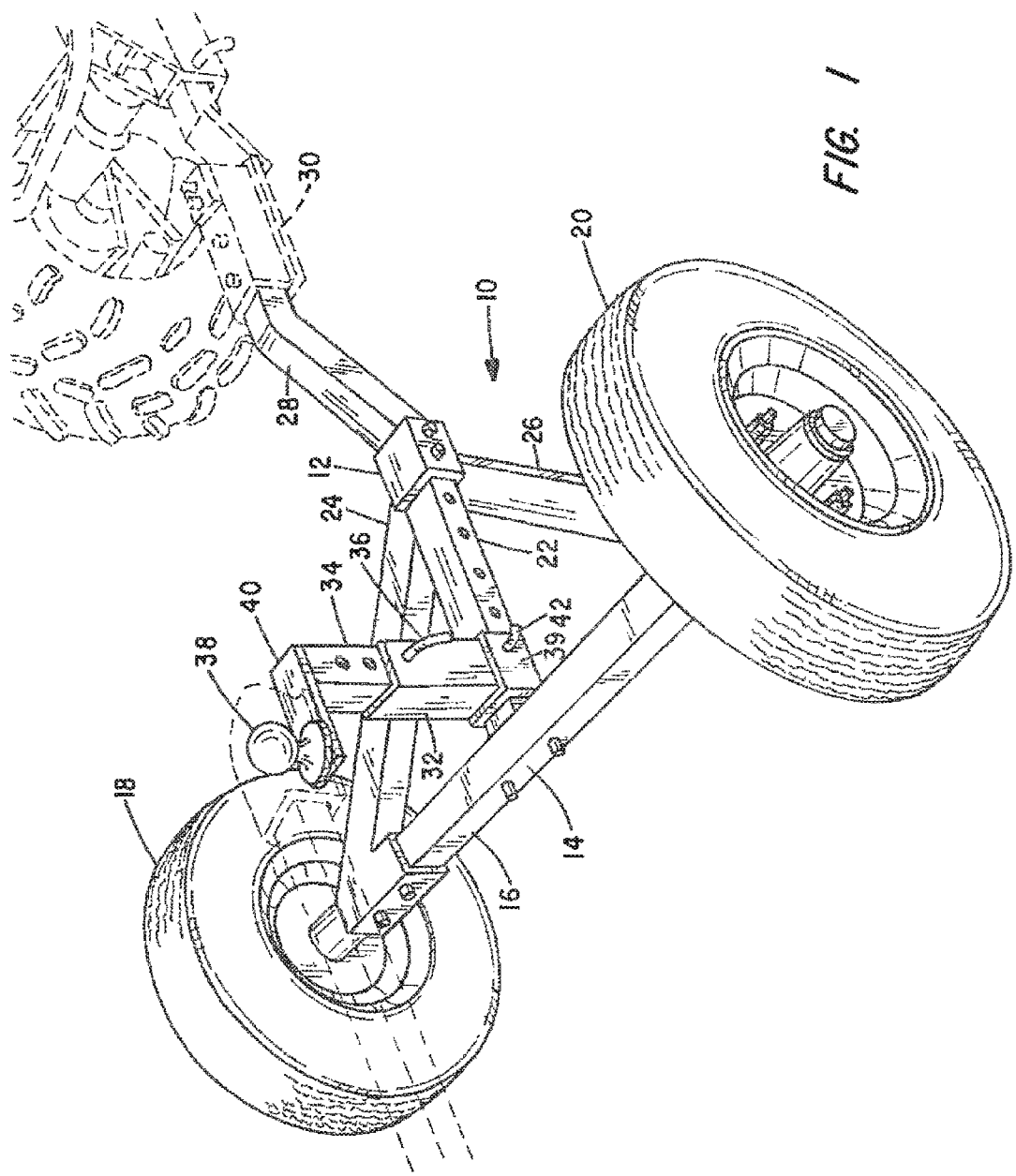
FIG. 1 is a perspective view of a trailer dolly shown with its ball hitch assembly positioned rearward.

The description of the preferred embodiment is intended to be read in connection with the accompanying drawings, which are to be considered part of the entire written description of this invention. In the description, relative terms such as "lower", "upper", "horizontal", "vertical", "above", "below", "up", "down", "top", and "bottom", as well as derivatives thereof (e.g., "horizontally", "downwardly", "upwardly", etc.), should be construed to refer to the orientation as then described or as shown in the drawings under discussion. These relative terms are for the convenience of description and do not require that the apparatus be constructed or operated in a particular orientation. Terms, such as "connected", "connecting", "attached", "attaching", "join", and "joining", are used interchangeably and refer to one structure or surface being secured to another structure or surface or integrally fabricated in one piece, unless expressly described otherwise.

Referring first to FIG. 1, a preferred embodiment of the invention is seen to comprise a main body indicated generally by numeral 10 having a proximal end 12 and a distal end 14. The main body includes an elongated axle member 16 at its distal end and journaled for rotation on opposed ends of the axle 16 are wheels 18 and 20. A bar member 22 is affixed to the axle 16 proximate a midpoint of the axle and completing the main body are diagonally extending struts 24 and 26 that extend from the opposed ends of the axle 16 and join to the bar member 22 at the proximal end thereof. The members comprising the main body preferably comprise steel tubing of rectangular cross-section, but other structural steel elements may be used as well.

Joined to the proximal end of the bar member 22 is a drawbar 28 and affixed to its proximal end is a conventional ball hitch coupler of a type well known in the art that is used to capture a hitch ball that is joined to the rear of the towing vehicle.

Slideably mounted on the bar member 22 is an upwardly extending ball hitch receiving socket 32 into which a post 34 is able to slide up and down. The post 34 includes a plurality of pairs of apertures that are aligned across the width dimension of the post and regularly spaced along the length dimension thereof. The socket 32 also includes a pair of aligned apertures which, when brought into alignment with the apertures in the post 34, allow a latch pin 36 to be inserted therethrough to set the height of a hitch ball 38 relative to the main body 10.

It is to be also noted that the hitch ball 38 is bolted to a plate 40 that is welded to the upper end of the post 34 and that the plate projects outward in a cantilevered fashion. The hitch ball is disposed on the cantilevered portion of the plate 40.

It is a further feature of the preferred embodiment that the ball hitch receiving socket 32 is repositionable by sliding it along the length of the bar member 22 and then inserting a latch pin 42 through aligned apertures in a collar portion 39 of the socket 32 and in the bar member 22.

Figure 2:
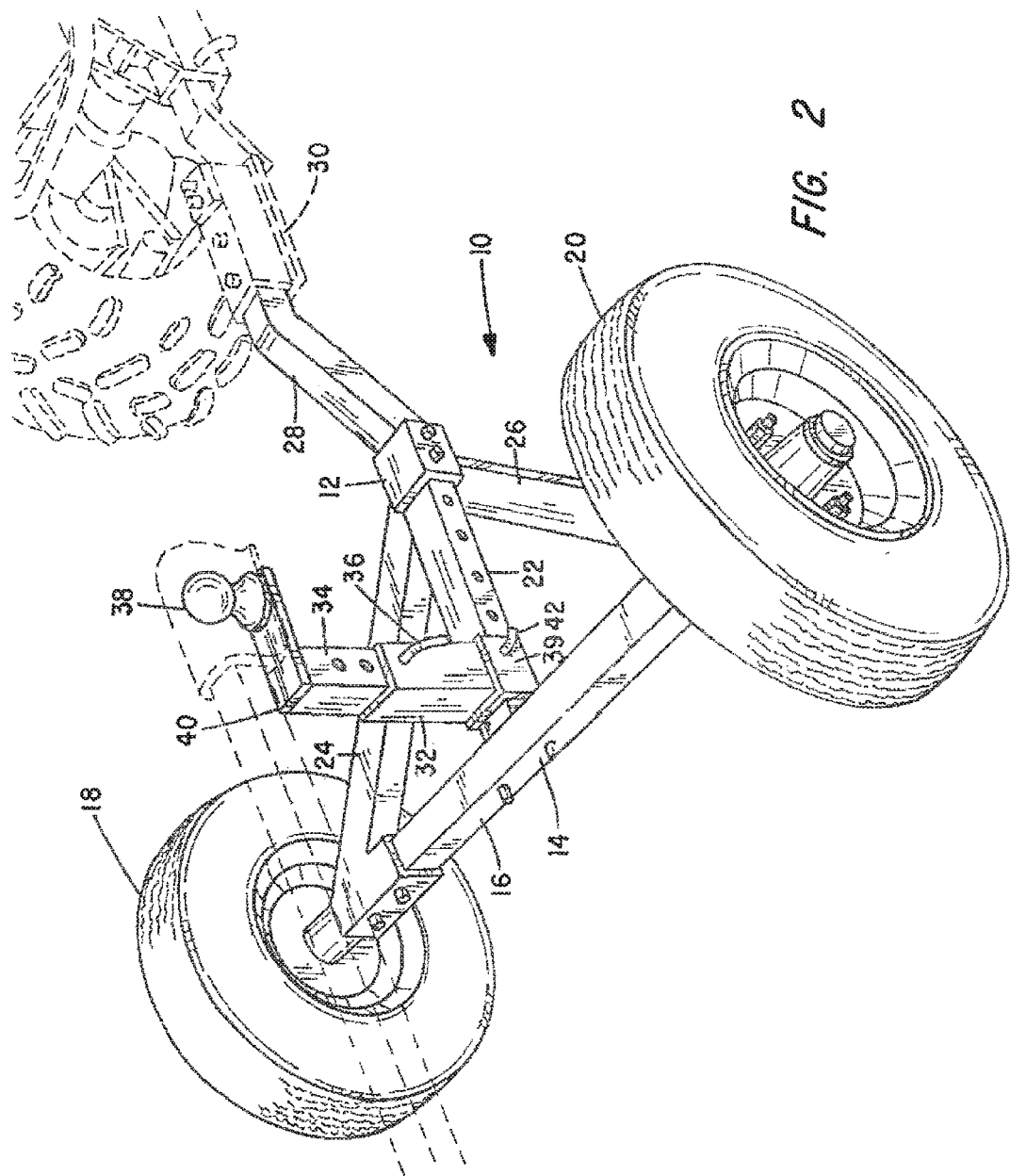
FIG. 2 is a similar view with the hitch ball facing forward in its socket.

As is seen in FIG. 1, by sliding the socket 32 in the distal direction and by inserting the post 34 into the socket 32 so that the cantilevered plate 40 extends rearward, the hitch ball 38 is generally vertically aligned with the axle 16 which has the effect of placing the tongue-weight of a towed trailer, whose tongue is drawn in phantom, directly over the axle. By inserting the post 34 in the socket 36 with the cantilevered portion supporting the hitch ball 38 facing forward as seen in FIG. 2 and by sliding the hitch ball receiving socket 32 forward toward the proximal end 12 of the main body 10 as seen in FIG. 3, a greater amount of the tongue-weight will be applied to the wheels of the towing vehicle to thereby increase traction of the towing vehicle's wheels with the ground.

While the preferred embodiment of the invention has been described above, it will be recognized and understood that various modifications can be made in the invention and the appended claims are intended to cover all such modifications which may fall within the spirit and scope of the invention.

What is claimed is:

1. A trailer dolly, comprising:
   (a) a main body having a proximal and distal end, the main body having an elongated axle at the distal end with wheels journaled for rotation on opposed ends of the axle, a bar member affixed to the axle proximate a midpoint of the axle and extending generally horizontally toward the proximal end of the main body;
   (b) a ball hitch receiving socket slideably mounted on the bar member and extending vertically upward therefrom; and
   (c) a ball hitch assembly including a post adapted to fit and slide within the ball hitch receiving socket, a plate affixed to an upper end of the post and including a cantilevered segment extending outward from the post's upper end and a hitch ball fastened to the cantilevered segment.

2. A trailer dolly as in claim 1 wherein the main body further includes a pair of diagonally extending braces, each having one end fastened to the axle proximate the opposed ends and another end fastened to the bar member proximate the proximal end of the main body.

3. A trailer dolly as in claim 2 and further including an elongate tow bar having a first end affixed to a proximal end of the bar member and a second end having a means adapted for releasably securing the tow bar to a towing vehicle.

4. A trailer dolly as in claim 1 and further including a collar surrounding the bar member with the ball hitch receiving socket joined to the collar, the collar having a pair of aligned apertures on opposed side surfaces thereof and the bar member having a plurality of pairs of aligned apertures extending through the bar member at regularly spaced intervals along a length of the bar member and a locking pin insertable through the pair of aligned apertures in the collar and a selected pair of aligned apertures extending through the bar member.

5. A trailer dolly as in claim 1 wherein the post of the ball hitch assembly is insertable in the hitch receiving socket with the hitch ball either disposed forward or rearward of a longitudinal axis of the hitch receiving socket.

6. A trailer dolly as in claim 5 wherein the ball hitch receiving socket includes a pair of aligned apertures on opposed side surfaces thereof and the post includes a plurality of regularly spaced apertures extending therethrough along a length thereof and a further locking pin insertable through the pair of apertures in the socket and through a selected one of apertures in the post for adjustably setting the height of the hitch ball relative to the main body.

* * * * *